United States Patent [19]

Uchida

[11] Patent Number: 5,010,266
[45] Date of Patent: Apr. 23, 1991

[54] ANTI-CLOGGING OFFSET FOR ROTOR OF SYNCHRONOUS MOTOR

[75] Inventor: Hiroyuki Uchida, Yamanashi, Japan

[73] Assignee: Fanuc LTD, Yamanashi, Japan

[21] Appl. No.: 368,400

[22] PCT Filed: Sep. 2, 1988

[86] PCT No.: PCT/JP88/00879

§ 371 Date: Apr. 25, 1989

§ 102(e) Date: Apr. 25, 1989

[87] PCT Pub. No.: WO89/02183

PCT Pub. Date: Mar. 9, 1989

[30] Foreign Application Priority Data

Sep. 3, 1987 [JP] Japan .................. 62-219242

[51] Int. Cl.$^5$ ........................... H02K 21/14
[52] U.S. Cl. ............................ 310/156; 310/261
[58] Field of Search ............ 310/112, 49 R, 114, 310/162, 156, 261, 42

[56] References Cited

U.S. PATENT DOCUMENTS

| | | | |
|---|---|---|---|
| 4,196,366 | 4/1980 | Schiethart | 310/162 |
| 4,700,096 | 10/1987 | Epars | 310/156 |
| 4,823,038 | 4/1989 | Mizutani et al. | 310/257 |
| 4,906,882 | 3/1990 | Erndt et al. | 310/261 |

FOREIGN PATENT DOCUMENTS

| | | |
|---|---|---|
| 0104830 | 4/1984 | European Pat. Off. . |
| 0140981 | 4/1984 | European Pat. Off. . |
| 0300042 | 7/1988 | European Pat. Off. . |
| 2631301 | 12/1976 | Fed. Rep. of Germany . |
| 58-163255 | 9/1983 | Japan . |
| 59-21267 | 3/1984 | Japan . |
| 59-92580 | 6/1984 | Japan . |
| 63-140645 | 3/1986 | Japan . |
| 61-199447 | 9/1986 | Japan . |
| 63-99749 | 5/1988 | Japan . |

Primary Examiner—Steven L. Stephan
Assistant Examiner—D. L. Rebsch
Attorney, Agent, or Firm—Armstrong, Nikaido, Marmelstein, Kubovcik & Murray

[57] ABSTRACT

A rotor (32) is constructed by arranging unitary rotor elements (34a, 34b) in a longitudinal direction thereof, and has a structure such that the angular position of each group of elements is shifted by an angle corresponding to a half wave of a slot ripple caused by the rotor in the prior art. Because the difference between the angular positions is generally small, and the rotor must be exactly constructed, rotor core elements (36a) and permanent magnet elements (38a) of each unitary rotor element (34a, 34b) are shifted in the longitudinal direction of the rotor (32) to form projections and recesses (54, 56) at the ends of each unitary rotor element (34a, 34b), and the ends of each unitary rotor element are held exactly in position by metal end plates (42a, 42b, 44a, 44b), formed by a mechanical press, having recessed portions (48) and projecting portions (46) which engage with the projections and recesses.

5 Claims, 3 Drawing Sheets

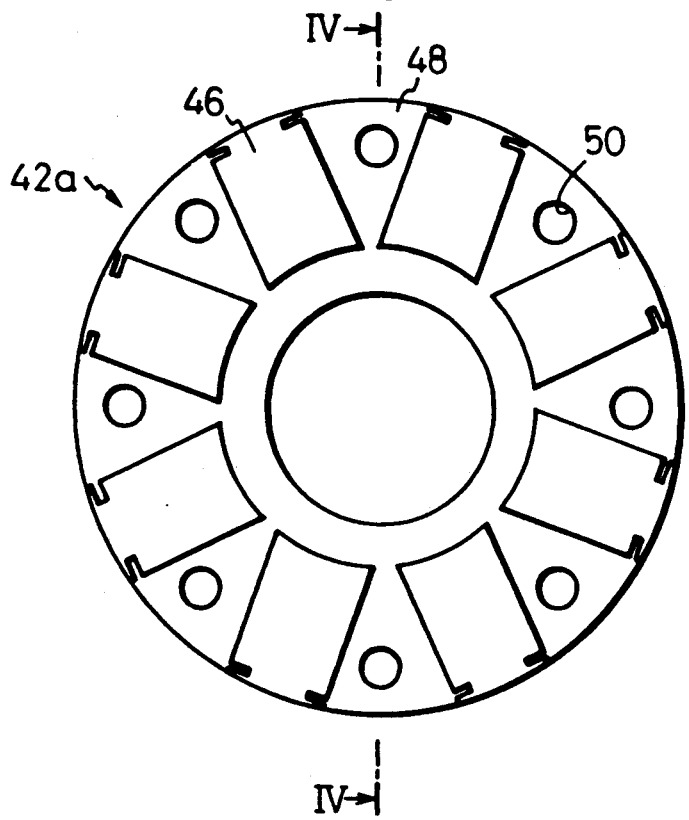
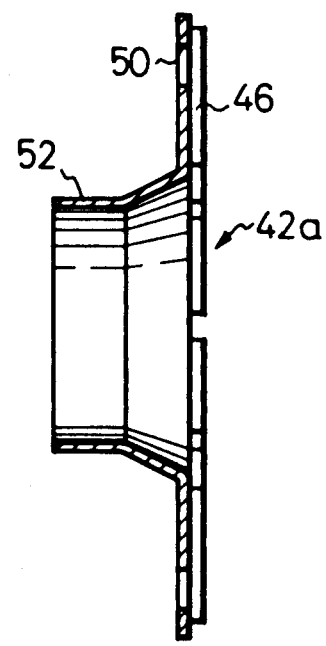
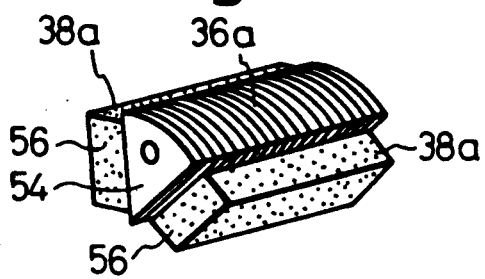

ANTI-CLOGGING OFFSET FOR ROTOR OF SYNCHRONOUS MOTOR

TECHNICAL FIELD

The present invention relates to a structure of a rotor of a radial type synchronous motor wherein the rotor core is held between permanent magnets, and more particularly, to a rotor structure whereby slot ripple is reduced.

BACKGROUND ART

Torque fluctuation, that is, slot ripple, occurs during the rotation of a rotor due to the presence of slots in a stator in a synchronous motor provided with a stator having slots for a winding, and a rotor having permanent magnets. This is due to a change in clearance between the rotor and the stator in correspondence with an angular position of the rotor, because of the slots in the stator, and a consequent change of density of magnetic flux. A slight fluctuation of feed velocity occurs when an electric motor having slot ripple is used, for example, in a feed mechanism of a machine tool, and thus the finished accuracy of a workpiece is poor.

To solve the above problem, the applicant disclosed, in Japanese Unexamined Patent Publication No. 63-178750, a rotor structure wherein the rotor is divided into a plurality of unitary rotor elements arranged along an axis thereof, and each unitary rotor element is fixed at a first angular position or a second angular position separated from the first angular position by a prescribed angle.

Seventy two slot ripples occur in one rotation of a rotor of, for example, an eight pole-synchronous motor having thirty six slots, and in this case, the angular difference between the above-mentioned first and second angular positions is 2.5 degrees, but an angular error of as much as one degree can occur during the manufacture and assembly of a rotor. In the above-mentioned rotor having two angular positions, when the error angle is 2.5 degrees, each slot ripple caused by a relative position between the stator slots and each unitary rotor element fixed at the first or second angular position has the same phase, and thus a slot ripple similar to a ripple in the prior art rotor not having a skew structure in which each angular position is shifted, occurs. Although the error in the angle between the two angular positions in a skew rotor is not necessarily exactly 2.5 degrees, the effect obtained by adopting the skew structure is substantially lost when an angular error of as much as one degree occurs

DISCLOSURE OF THE INVENTION

To solve the above problem, an object of the present invention is to provide a rotor structure wherein each unitary rotor element is fixed exactly at a predetermined first or second angular position.

Therefore, according to the present invention, there is provided a rotor structure of a synchronous motor having a rotor core held between permanent magnets, wherein each of a plurality of unitary rotor elements constituting a rotor is arranged at one angular position or at another angular position around a central axis of the rotor in correspondence with a period of a slot ripple of the motor; an angular difference between the two angular positions is an angle corresponding to a half wave of the slot ripple; end portions of permanent magnet elements and rotor core elements, which elements constitute the unitary rotor element in each angular position, provide recesses and projections in a direction parallel to the central axis; and an end plate member is engaged with the recesses and projections formed by the permanent magnet elements and the rotor core elements.

Each of two groups of unitary rotor elements in two angular positions constituting a rotor is held exactly at a respective prescribed angular position by the end plate member having projecting portions and recessed portions engaged with the recesses and the projections provided by end portions of the permanent magnet elements and the rotor core elements of the unitary rotor element, whereby slot ripple is considerably reduced.

BRIEF DESCRIPTION OF THE DRAWINGS

FIG. 2 is a cross sectional view of the rotor, taken along the line II—II of FIG. 1a;

FIG. 3 is a cross sectional view of the rotor, taken along the line III—III of FIG. 1a, showing the back of an end plate member;

FIG. 4a is a sectional view of the end plate member, taken along the line IVa—IVa of FIG. 3;

FIG. 4b is a sectional view of the end plate member, taken along line IVb—IVb of FIG. 3.

FIG. 5 is a partial perspective view of one rotor element of the rotor according to the present invention.

BEST MODE OF CARRYING OUT THE INVENTION

Figure 6A:
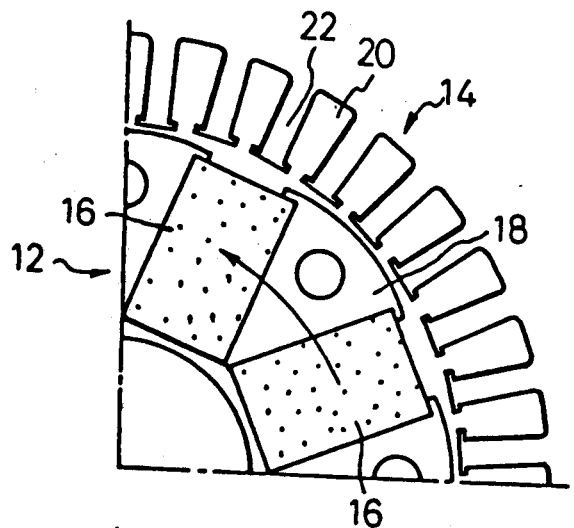
FIGS. 6a, 6b, and 6c are views for explaining a period of a slot ripple.
Figure 6B:
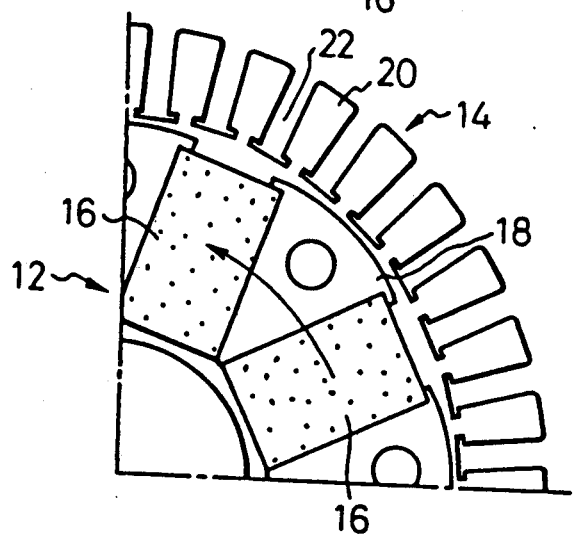
Figure 6C:
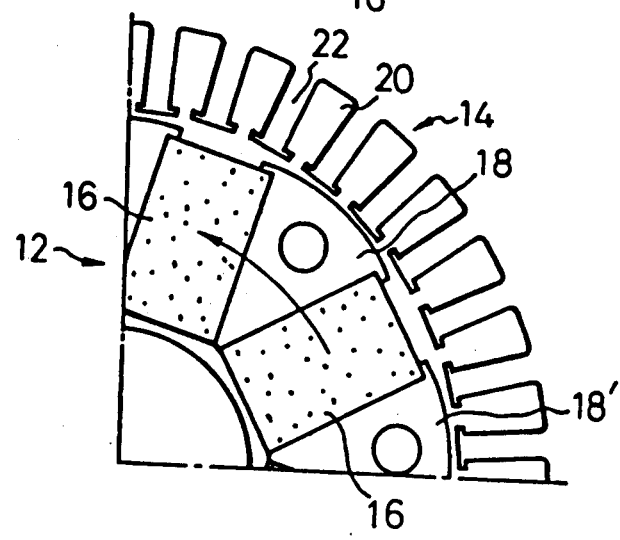

The present invention is described in more detail in the following in accordance with the embodiments shown in the attached drawings FIGS. 6a, 6b, and 6c show a quarter section of a synchronous motor comprising an eight poles type rotor 12 having a laminated rotor core 18 held between permanent magnets 16, and a stator 14 having thirty six slots 20. The positioning of the rotor core 18 relative to the slots 20 (or side wall portions forming the slots 20) of the stator 14 changes from FIG. 6a to FIG. 6b to FIG. 6c, in accordance with a rotation of the rotor 12 in a direction shown by an arrow. Although the position of the rotor core 18 in FIG. 6c appears to be different from the position thereof in FIG. 6a, a close look thereat will show that the position of a rotor core 18' adjacent to the rotor core 18 in FIG. 6c, relative to the slots 20 of the stator 14, is the same as that of the rotor core 18 in FIG. 6a. Namely, the overall positioning thereof relative to the slots 20 of the stator 14 in FIG. 6c is the same as in FIG. 6a. The rotational angle of the rotor 12 from the position shown in FIG. 6a to the position shown in FIG. 6c is 5 degrees, and slot ripple occurs having a period equivalent to the time during which the rotor 12 is rotated by the above-mentioned 5 degrees.

The structure in which each group of unitary rotor elements is arranged at one or another of two angular positions is disclosed in Japanese Unexamined Patent Publication No. 63-178750 by the present applicant, using the concept of dividing the rotor 12 into two groups of unitary rotor elements, each of which is arranged along the central axis thereof, to reduce slot ripple. The angular difference between these two groups is 2.5 degrees in the example shown in FIGS. 6a–6c, and a rotor having the structure in which the slot ripples cancel each other out due to a shifting of phase of each slot ripple by a half period, which ripple is caused by the positioning of each group of unitary rotor elements relative to the slots of the stator, is disclosed.

Figure 1:
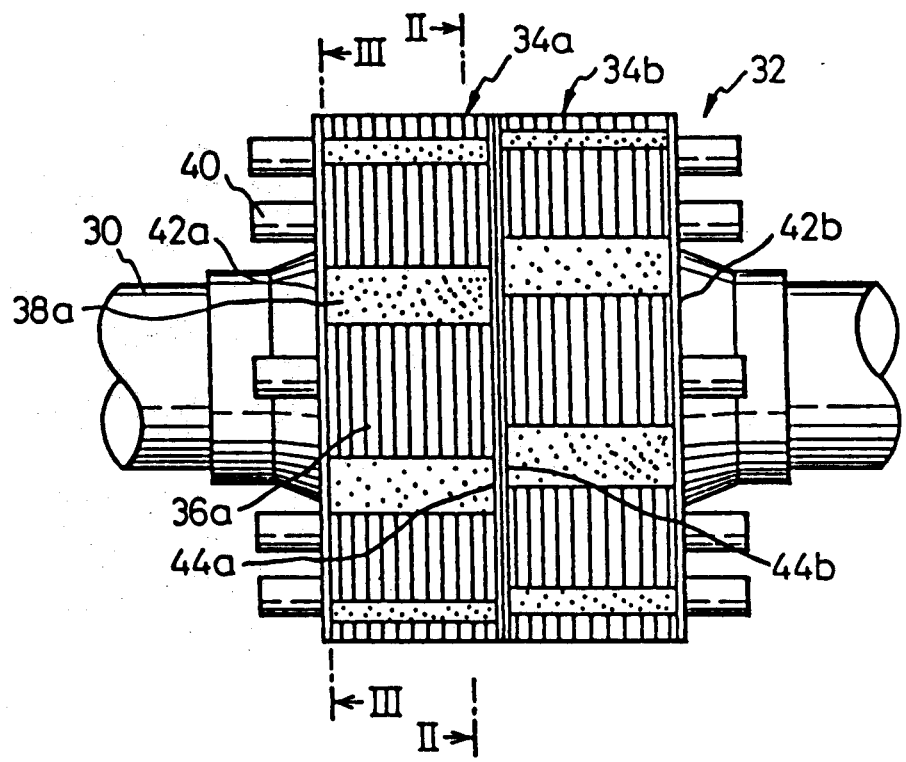
FIG. 1a is a schematical general plan view of a rotor according to the present invention; this figure does not fully show details of the end plate member.
FIG. 1b shows a partial enlarged portion in detail.
Figure 2:
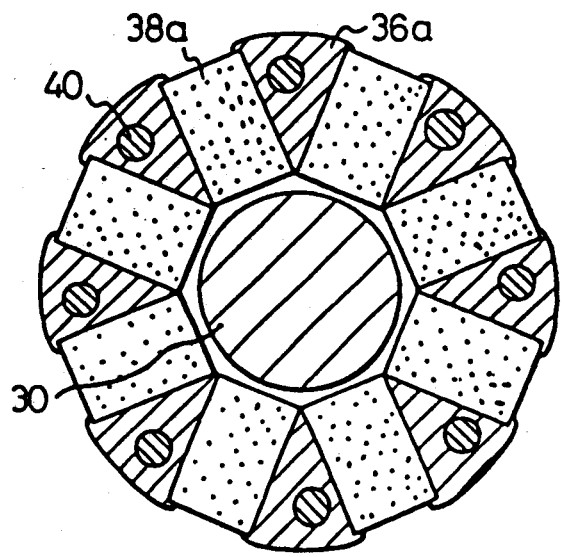

The present invention discloses a device by which a rotor is provided with a structure having an exact angular difference between two groups, for example, 2.5 degrees Referring to FIG. 1a and FIG. 2, one group of unitary rotor elements consists of one unitary rotor element 34a, and the other group of unitary rotor elements consists of the other unitary rotor element 34b. Each of the unitary rotor elements 34a, 34b may be formed by a plurality of unitary rotor elements, and each unitary rotor element of the two groups may be alternately arranged.

Each unitary rotor element 34a and 34b is formed by the same unitary rotor element, and the unitary rotor element 34a comprises a permanent magnet element 38a (hereinafter called permanent magnet 38a) and a laminated rotor core element 36a (hereinafter called rotor core 36a) held by permanent magnets 38a. Unitary rotor elements 34a and 34b are arranged with an angular difference of 2.5 degrees between the angular positions thereof by using end plates 42a and 42b and central end plates 44a and 44b centrally positioned in the rotor 32 and described in detail hereinafter, and each unitary rotor element is restricted to form a rotor 32 by an insertion of connecting rods 40 along a line parallel to a central axis of the rotor 32. The rotor 32 constructed in such a manner is fixed to an output shaft 30 by a known device.

Referring to FIG. 5, which is a perspective partial view of the unitary rotor element 34a in FIG. 1a, an end face 54 of the rotor core 36a projects relative to an end face 56 of the permanent magnet 38a, and thus the unitary rotor element 34a is held in position by the end plate 42a having recessed portions and projecting portions corresponding to the projection and the recess formed by the end faces 54 and 56, respectively, of the rotor core 36a and the permanent magnet 38a. Referring to FIG. 3 and FIGS. 4a and 4b, the end plate 42a has a recessed portion 48 corresponding to the projecting portion 54 of the rotor core 36a and a projecting portion 46 corresponding to the recessed portion 56 of the permanent magnet 38a arranged alternately in a circle. FIG. 1b is a partial side view of these elements in the assembled condition. Furthermore, a hole 50 into which the above-mentioned connecting rod 40 (FIG. 1a) is pressed is formed in the recessed portion 48, and an annular portion 52 forming a hole into which the output shaft 30 is inserted is formed at the central portion of the end plate 42a. The output shaft 30 may be pressed into the annular portion 52 of the rotor 32, or may be connected to the rotor 32 by a known member.

The end plate 42b on the other side of the rotor 32 may be the same as the above-mentioned end plate 42a, and an end portion of the unitary rotor element 34b may also be formed to provide the projection and recess shown in FIG. 5. Although the end face 54 of the rotor core 36a described above projects beyond permanent magnet 56 conversely the end face 56 of the permanent magnet 38a may be made to project beyond motor core 36a. The foregoing annular portion 52 of the end plate becomes unnecessary, and tho end plate 42a may have a structure wherein only a hole for insertion of the output shaft 30 is formed at the central portion thereof.

In the embodiment shown in FIG. 1a, annular end plates 44a, 44b, each having recessed portions and projecting portions similar to the above are also arranged on the other end of each unitary rotor element 34a or 34b, namely, at the middle of the rotor 32. The end faces the unitary rotor element 34a or 34b in the middle of the rotor form the projection and recess corresponding to the recessed portion and projecting portion of the annular end plate 44a or 44b. Such end plates positioned in the middle of the rotor are useful when each unitary rotor element is to be exactly positioned, in the case of a long rotor along a central axis thereof, and two annular end plates 44a and 44b may be formed into the same shape.

The provision of the end plates enables a prevention of rotation of the rotor core 36a around the connecting rod 40, movement of the permanent magnet 38a and the rotor core 36a in a radial direction due to dimensional errors occurred during manufacture, especially errors in the permanent magnet 38a, and deformation of the arrangement of all groups of the permanent magnets 38a and the rotor core 36a in the direction of rotation, and so on. These end plates can be manufactured by a mechanical pressing of a metal plate, and are easily manufactured with a high accuracy. Therefore, each unitary rotor element 34a and 34b can be exactly positioned by using such a press-formed end plate. Preferably, a stainless steel having magnetic field insulating properties is used as the material of the end plate, to prevent leakage of a magnetic flux in a direction parallel to the central axis of the rotor 32. The end plate can be also manufactured by molding a resin material.

Also, in a synchronous motor of the type wherein permanent magnets are applied to the surface of the rotor core of the motor, the permanent magnets can be held by an end plate similar to the above-mentioned end plate, although in the above-mentioned synchronous motor, the rotor core is held between permanent magnets.

As apparent from the foregoing description, according to the present invention, a rotor structure of a synchronous motor can be provided wherein each of two groups of unitary rotor elements is relatively positioned by end plates formed with a high accuracy, to maintain an exact angular difference therebetween, and therefore, slot ripple can be reduced.

What is claimed is:

1. A rotor structure of a synchronous motor having a rotor core held between permanent magnets, wherein each of a plurality of unitary rotor elements constituting the rotor is arranged at one of two different angular positions around a central axis of said rotor which positions correspond with a period of slot ripple of the motor, such that an angular difference between said two angular positions is an angle corresponding to a half wave of the slot ripple, wherein axial end portions of permanent magnet elements and rotor core elements which together constitute the unitary rotor element in each angular position provide axial recesses and projections, and wherein each unitary rotor element of said rotor is provided with end plate members arranged at both ends of said rotor and between said unitary rotor elements, said end plate members being formed with axial projections and recesses engaged, respectively, with said axial recesses and projections formed by said permanent magnet elements and said rotor core elements such that said end plate members hold each unitary rotor element precisely at a prescribed angular position.

2. A rotor structure of a synchronous motor according to claim 1, wherein the shapes of said recesses and projections of both ends of each unitary rotor element of said rotor are the same, each end plate member arranged at both ends of said rotor has the same shape and each end plate member arranged between said unitary rotor elements has the same shape, to prevent deformation of the arrangement of said permanent magnet elements and said rotor core elements.

3. A rotor structure of a synchronous motor according to claim 1, wherein said motor includes end plate members arranged at both ends of said rotor and between said unitary rotor elements to hold each unitary rotor element precisely at a prescribed angular position.

4. A rotor structure of a synchronous motor according to claim 1, wherein end plate members arranged at both ends of said rotor, comprise devices enabling connection to an output shaft of the synchronous motor.

5. A rotor structure of a synchronous motor according to claim 1, wherein lack said rotor element has eight poles, and each said end plate member comprises eight recessed portions and eight projecting portions, arranged alternately.

* * * * *